(12) United States Patent
Tsukimoto

(10) Patent No.: US 6,353,816 B1
(45) Date of Patent: Mar. 5, 2002

(54) METHOD, APPARATUS AND STORAGE MEDIUM CONFIGURED TO ANALYZE PREDICTIVE ACCURACY OF A TRAINED NEURAL NETWORK

(75) Inventor: Hiroshi Tsukimoto, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/100,493

(22) Filed: Jun. 22, 1998

(30) Foreign Application Priority Data

Jun. 23, 1997 (JP) .............................. 9-166347

(51) Int. Cl.⁷ ............................................... G06G 7/00
(52) U.S. Cl. ........................................ 706/17; 706/21
(58) Field of Search ............................. 706/13, 17, 21

(56) References Cited

U.S. PATENT DOCUMENTS

| | | | |
|---|---|---|---|
| 4,755,928 A | * | 7/1988 | Johnson et al. |
| 4,833,679 A | | 5/1989 | Anderson et al. |
| 4,837,675 A | * | 6/1989 | Bean et al. .................. 364/200 |
| 4,972,368 A | | 11/1990 | O'Brien et al. |
| 5,210,865 A | * | 5/1993 | Davis et al. ................. 395/575 |
| 5,210,866 A | | 5/1993 | Milligan et al. |
| 5,226,157 A | * | 7/1993 | Nakano et al. ............. 395/600 |
| 5,263,154 A | | 11/1993 | Eastridge et al. |
| 5,276,860 A | | 1/1994 | Fortier et al. |
| 5,375,232 A | | 12/1994 | Legvold et al. |
| 5,379,398 A | | 1/1995 | Cohn et al. |
| 5,388,243 A | * | 2/1995 | Glider et al. ............... 395/425 |
| 5,454,099 A | | 9/1995 | Myers et al. |
| 5,455,946 A | | 10/1995 | Mohan et al. |
| 5,457,796 A | | 10/1995 | Thompson |
| 5,497,483 A | | 3/1996 | Beardsley et al. |
| 5,519,647 A | * | 5/1996 | DeVille ....................... 706/17 |

(List continued on next page.)

FOREIGN PATENT DOCUMENTS

JP          2-294768          12/1990

OTHER PUBLICATIONS

IBM Corporation, IBM TDB 09/81 p1947, Sep. 1981, Overlapping Data Streaming and Concurrent Read Write References Within a Storage Subsystem.
Siu et al, "Rational Approximation, Harmonic Analysis and Neural Networks" IEEE, IJCNN, Jun. 1992.*
Paturi et al, "On Threshold, Circuits for Parity", IEEE Proceedings of 31st Annual Symposium on Foundation of Computer Science, Oct. 1990.*
Ursic, S., "Synthesis of Neural Networks with Linear Programs", IEEE, IJCNN, Jun. 1990.*
Qi. Li, "Synthesizing Neural Networks by Sequential Addition of Hidden Nodes", IEEE International Conference on Computational Intelligence, Jun.–Jul. 1994.*

(List continued on next page.)

*Primary Examiner*—George B. Davis
(74) *Attorney, Agent, or Firm*—Oblon, Spivak, McClelland, Maier & Neustadt, P.C.

(57) ABSTRACT

A neural network analysis apparatus has an input means 1 for inputting multilinear functions that represent the various units of a trained neural network, a storage means 2 therefor, term generators 3 that successively generate terms of a Boolean function used for approximation from the coefficients of each term of the multilinear function input for each unit, a judgment condition storage section 22 into which is stored the conditions for generating each term of the Boolean function to be used in the approximation, an apparatus 5 that links the generated Boolean function terms, and a Boolean function synthesizing apparatus 6 for representing the output unit by input variables. The term generators 3 each have four sub-apparatuses: a data-limiting apparatus 31, a minimum value calculation apparatus 32, a non-important, attribute processing apparatus 33, and a function judgment apparatus 34.

13 Claims, 11 Drawing Sheets

U.S. PATENT DOCUMENTS

| | | | |
|---|---|---|---|
| 5,535,381 A | | 7/1996 | Kopper |
| 5,559,991 A | | 9/1996 | Kanfi |
| 5,574,906 A | | 11/1996 | Morris |
| 5,574,950 A | * | 11/1996 | Hathorn ...................... 395/861 |
| 5,596,707 A | * | 1/1997 | Ohta ...................... 395/182.04 |
| 5,634,052 A | | 5/1997 | Morris |
| 5,642,304 A | * | 6/1997 | Simpson ...................... 708/446 |
| 5,689,728 A | * | 11/1997 | Sugimoto et al. ............ 395/858 |
| 5,809,543 A | * | 9/1998 | Byers et al. ................. 711/162 |
| 5,832,467 A | * | 11/1998 | Wavish ......................... 706/13 |
| 5,898,891 A | * | 4/1999 | Meyer ......................... 395/853 |
| 5,926,804 A | * | 7/1999 | Tufts et al. ................... 706/25 |
| 5,953,513 A | * | 9/1999 | Saika et al. ................. 395/500 |
| 6,145,028 A | * | 1/2000 | Shank et al. .................. 710/31 |
| 6,092,216 A | * | 7/2000 | Kobayashi et al. ............ 714/9 |

OTHER PUBLICATIONS

DePoletal, "Sparse Initial Topologies for High Order Perceptions", IEEE International Conference on Neural Networks, Jun. 1996.*

Utschick et al, "Bayesian Adaptation of Hidden Layers in Boolean Feedforward Neural Networks" IEEE Proceedings of the 13th Inter. Conf. on Pattern Recognition, Aug. 1996.*

Hirschauer et al, "Design of Neural Estimators for Multisensors: Second Order Backpropagation, Initialization and Generalization", Apr. 1994.*

1994 IEEE International Conference on Acoustics, Speech and Signal Processing.*

Craven, Mark W.; "Extracting Comprehensible Models from Trained Neural Networks"; PhD thesis, Department of Computer Sciences, University of Wisconsin–Madison; pp. 25–38, 1996.*

Taha, Ismail et al.; "Symbolic Interpretation of Artificial Neural Networks"; IEEE Transactions on Knowledge and Data Engineering; vol. 11, No. 3, pp. 448–463; May/Jun. 1999.*

Ludermir, Teresa B.; "Extracting Rules from Feedforward Boolean Neural Networks"; IEEE; pp. 61–66, 1998.*

Setiono, Rudy et al.; "Understanding Neural Networks via Rule Extraction"; IJCAI; pp 480–485, 1995.*

* cited by examiner

FIG.7
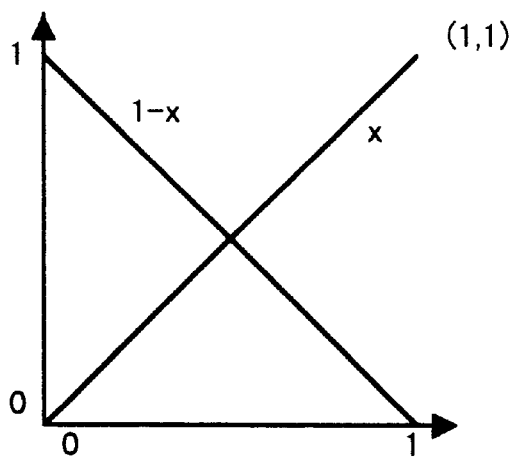 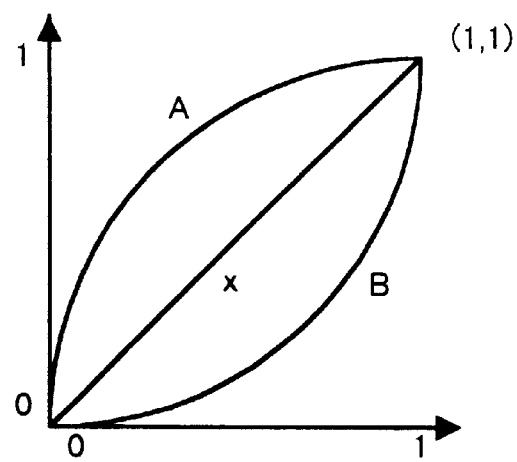

METHOD, APPARATUS AND STORAGE MEDIUM CONFIGURED TO ANALYZE PREDICTIVE ACCURACY OF A TRAINED NEURAL NETWORK

BACKGROUND OF THE INVENTION

1. Field of the Invention

The present invention relates to a trained neural network analysis method and to an apparatus for executing the analysis method.

2. Description of Related Art (1) Neural Networks

A neural network is an artificial neural circuit network that emulates the operation of a neural circuit network of a human using a computer. In a neural network, there is one or more intermediate layers between a data input part and a data output part, each of these layers being made up of a plurality of units, network-like connections being made between the input/output sections and the intermediate layers by means of the input/output systems. Because this neural network has non-linear components, it is capable of performing extremely complex approximations with respect to a variety of data types. Because of this, neural networks are currently used in many industries, including manufacturing and service industries. In these applications, a various types of data are input to the neural network for training, this being used in such applications as character recognition, image recognition, and prediction.

When a neural network is trained, weighting coefficients and biases are randomly applied with respect to the input data for each of units that accepts data. As data is input under these conditions, judgments are made with regard to the correctness of the output resulting from calculation according to these weighting coefficients. Whether or not the output results are correct is fed back using a learning method such as back-propagation, the originally set weighting coefficients and biases being corrected, and data being re-input. By repeating this process of input and correction of weighting coefficients and biases a large number of times, the weighting coefficients and biases that will obtain an appropriate output for a prescribed data input are established. In this case, the weighting coefficients and biases of each unit of the trained neural network are expressed by a function such as a sigmoid function. By installing such a trained neural network into a character recognition, image processing or other system that is implemented by a computer, the neural network can be put into practical use.

(2) Problems Associated With Trained Neural Networks

In designing a neural network such as noted above, the establishment of how each of the units making up the neural network, that is, the input layer, the intermediate layer and the output layer, are to be placed is done empirically, based on input data and the output data that is to be used. For this reason, with regard to whether or not each unit is redundant, and whether or not there are insufficient units must be predicted empirically from the accuracy of learning results and the learning efficiency. For this reason, even if there is a redundancy, because it was not possible to make a judgment as to whether or not there is a redundancy, installation in the system was necessary, as long as the learning efficiency is high, thereby leading to an increase in the computer memory capacity and to a decrease in processing speed. In the case of a neural network with a bad learning efficiency, there was a need to re-design the overall neural network according to empirical rules, thereby preventing the use of learning results.

In the previous art, however, even if it was known that an output would be obtained in response to learning results by inputting prescribed data to a trained neural network, it was not possible by looking at just the sigmoid function after training to judge how the neural network itself was operating, and to judge what role each of the units was playing in the neural network. Essentially, to make the operation of the neural network understandable to a human, it is necessary to express the behavior of the individual units as propositions that are close to natural language. In the above-noted trained neural network, however, the sigmoid function which represents the individual units of the neural network is expressed in terms of weighting coefficients and bias values, and it is not possible to distinguish just what these mean in the neural network.

The present invention was made to solve the above-described drawbacks of the previous art, and has an object the provision of a neural network analysis method and apparatus which approximates a multilinear function (such as a sigmoid function) which represents each of the units of a neural network with the nearest Boolean function, analyzing the meaning of each unit of a trained neural network, so as to express it as a proposition that can be understood by a human.

The present invention has as another object the provision of a neural network analysis method and apparatus which, when approximating multilinear functions that represent the units of a neural network, perform approximation over only the learning data domain, thereby not only obtaining high-accuracy Boolean functions, and also reducing the amount of calculations and shortening the processing time.

SUMMARY OF THE INVENTION

To achieve the above-noted objects, the present invention is a neural network analysis apparatus comprising: input means for inputting a multilinear function that represents each hidden unit and an output unit of a trained neural network to be analyzed; a function-extracting apparatus, which approximates a multilinear function that represents each unit with a Boolean function, said function extracting means being provided in accordance with each hidden and output unit of said neural network; and a Boolean function-synthesizing apparatus for synthesizing Boolean functions, which synthesizes Boolean function obtained by each function-extracting apparatus, said function-extracting apparatus comprising a term generator that generates each term of said Boolean function, and a term-linking apparatus that links terms generated by said term generator using a logical sum, and said term generator having a data-limiting apparatus that limits learning data to a domain corresponding to a term that judges whether said term exists in a Boolean function after approximation.

In this aspect of the present invention, because the units of a neural network are represented by Boolean functions which are abstract classical logic propositions from natural language, the resulting propositions are easy for a human to understand, thereby providing an understanding of which unit has learned which proposition or concept. Furthermore, because the Boolean functions used in the approximation are the closest in the learning data domain, predicted values are not included, resulting in highly accurate Boolean functions.

DESCRIPTION OF THE DRAWINGS

FIG. 7 is a graph which shows implementability of the second embodiment of the present invention.

DETAILED DESCRIPTION OF THE PREFERRED EMBODIMENTS

Figure 1:
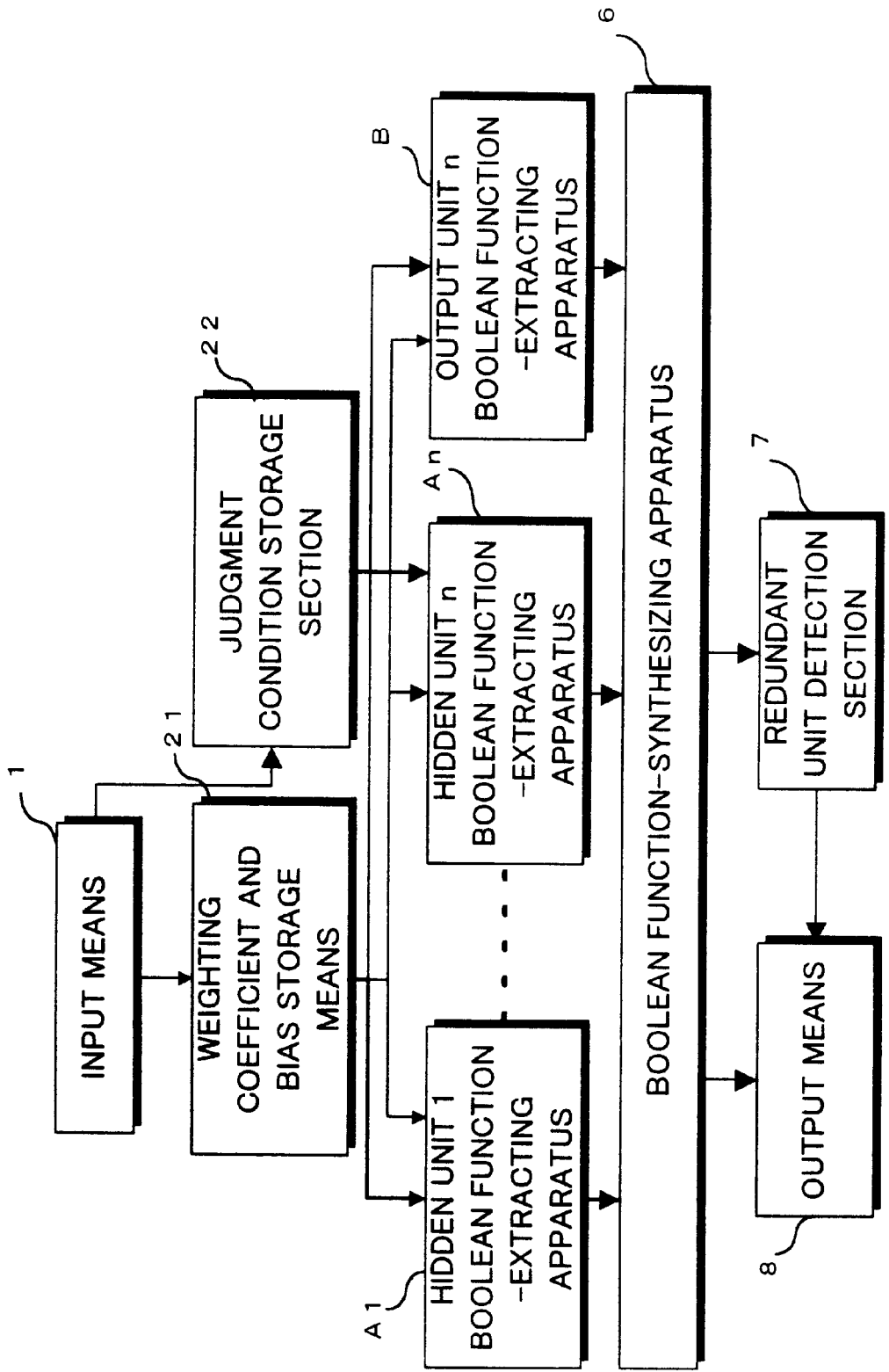
FIG. 1 is a block diagram which shows the overall configuration of the first embodiment of the present invention.

The basic concept of the present invention is as follows.
(1) Prerequisite Knowledge The prerequisite knowledge when approximating units using Boolean functions is as follows.
(1-1) Multilinear Function Space An n-variable multilinear function $f(x_1, \ldots x_n)$ is defined as follows.

$$f(x_1, \ldots, x_n) = \Sigma p_i x_1^{e_1} \ldots x_n^{e_n}$$

In the above equation, $p_i$ is a real number, $x_i$ is a variable, and $e_i$ is either 1 or 0. For example, a 2-variable multilinear function f (x, y) is as follows.

$$f(x,y) = pxy + qx + ry + s$$

(1-2) The Multilinear Function Space as an Extension of Boolean Algebra

If the do main of a variable is the discrete domain of {0, 1}, the multilinear function space is the linear space covered by the atoms of the Boolean algebra of Boolean functions. For a domain of {0, 1}, the multilinear function space is a Euclidean space. That is, for the domain of {0, 1}, the inner product is defined as follows.

$$<f,g> = \Sigma_{(0,1)^n} fg$$

In a domain such as this, the multilinear function space is a Euclidean space covered by atoms of the Boolean algebra of Boolean functions. For the proof of this, refer to "Symbol Processing as an Approximation for Pattern Processing," in The Transactions of the Institute of Electronics, Information, and Communication Engineers,, Vol. J78-D-II, No.2, pp.333–339, 1995.
(1-3) The Multilinear Function Space as a Euclidean Space If the domain is the continuous domain [0, 1], the multifunction space is a Euclidean space.

Essentially, for the case of the domain [0. 1], if the inner product f<f, g> is defined as follows, the multilinear function space is a Euclidean space.

$$<f,g> = 2\int_0^1 \gamma(f,g) dx$$

In the above, $\tau(x_n) = x$.

The proof of the above can be found in "Geometric Model of Proposition Theory" in Transactions of the Information Processing Society of Japan, Vol. 31, pp. 783–791, 1990.
(1-4) The Units of Neural Networks as Multilinear Functions The units of Neural Networks are multilinear functions. The functions that can be learned by a neural network in the case of a discrete domain are multilinear functions. For a continuous domain, however, it is possible to normalize the domain to [0, 1] by an appropriate method. For the case of the domain [0.1], the above-noted theorem obtains in approximation. That is, the following relationships obtain.

$$x^n = \begin{cases} x & (n \le a) \\ 0 & (n > a) \end{cases}$$

In the above, a is a natural number.

The proof of the above can be found in "Theoretical Analysis of Neural Networks" in research report SIG-FAI-950, 1, pp. 25–32, 1995 of the Japanese Society for Artificial Intelligence.
(1-5) Boolean Function Approximation of a Multilinear Function Consider the approximation of a multilinear function by the closest Boolean function. If the logical vector of a multilinear function is ($f_i$) and the logical vector of Boolean function is ($g_i$) (where $g_i = 0$ or 1), the approximation method is as follows.

$$g_i = \begin{cases} 1 & (f_i \ge 0.5) \\ 0 & (f_i < 0.5) \end{cases}$$

Essentially, the approximation of these two logical vectors means the minimization of the distance between the two vectors within the Euclidean space. The quantity to be minimized is as follows.

$$\Sigma(f_i - g_i)^2$$

In the above, because the term $(f_i - g_i)^2$ is independent, the minimization of each term is equivalent to minimizing $$\Sigma(f_i - g_i)^2$$

Because $g_i$ is either 1 or 0, if the value of $g_i$ which minimizes $(f_i - g_i)^2$ is $$f_i > 0.5$$

$g_i = 1$, and in other cases $g_i = 0$. The above expression, therefore, obtains.

Details of the above can be found in "Inductive Learning from Probability Data" in Journal of Japanese Society for Artificial Intelligence, Vol. 7, No. 5, pp. 870–876, 1992.
(1-6) Approximation for the Case of Two Variables The domains of each variable and the relationship between the output values of each unit of the neural network (hereinafter referred to as the neurovalues) and the Boolean function values for the case of a neural network having the two variables x and y will be described with reference to FIG. 9. In this description a discrete learning data domain will be assumed. Even in the case of a continuous domain, because the algorithm is exactly the same with the exception of one processing step, all the descriptions which follow will be with regard to the case of a discrete domain. The processing step that is different in the case of a continuous domain will be described later.

Figure 9:
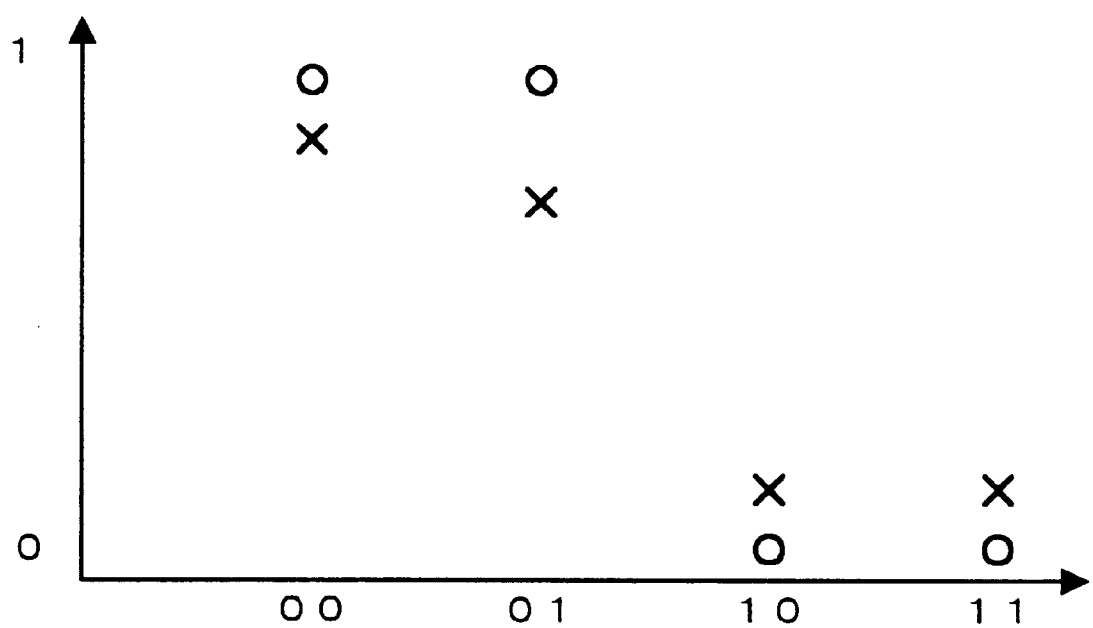
FIG. 9 is a graph which shows the output neurovalues from each unit in the domain for each variable, and the Boolean function used to approximate these values.

Referring to FIG. 9, the neurovalue domain for the various units is [0, 1]. That is, the output values for each of the units is normalized to within the range from 0 to 1. In this drawing, the x symbols represent neurovalues, and the o symbols represent approximated Boolean function values. The 00, 01, 10, and 11 represent the domain of the variables x and y. For example, 00 indicates x=0, y=0. In this case, the Boolean function values would be as follows.

g (0, 0)=1
g (0, 1)=1
g (1, 0)=0
g (1, 1)=0

The Boolean function that takes these values is $$g(x, y) = \bar{x}.$$

We will now introduce the concept of a Boolean function term and the domain that corresponds to that term. A Boolean function term is generated by the logical product with the negation from a plurality of variables. For example $$x, x\bar{y}$$

is a term, but $$x \vee y$$

is not a term. The domain corresponding to a term is defined as 1 for the case in which a variable appearing in that term is true and 0 for the case in which a variable appearing in the term is false. Thus, for example, in the case of $$x\bar{y},$$

the corresponding domain is x=1, y=0, and in the case of y, the corresponding domain is simply y=1.

Figure 10:
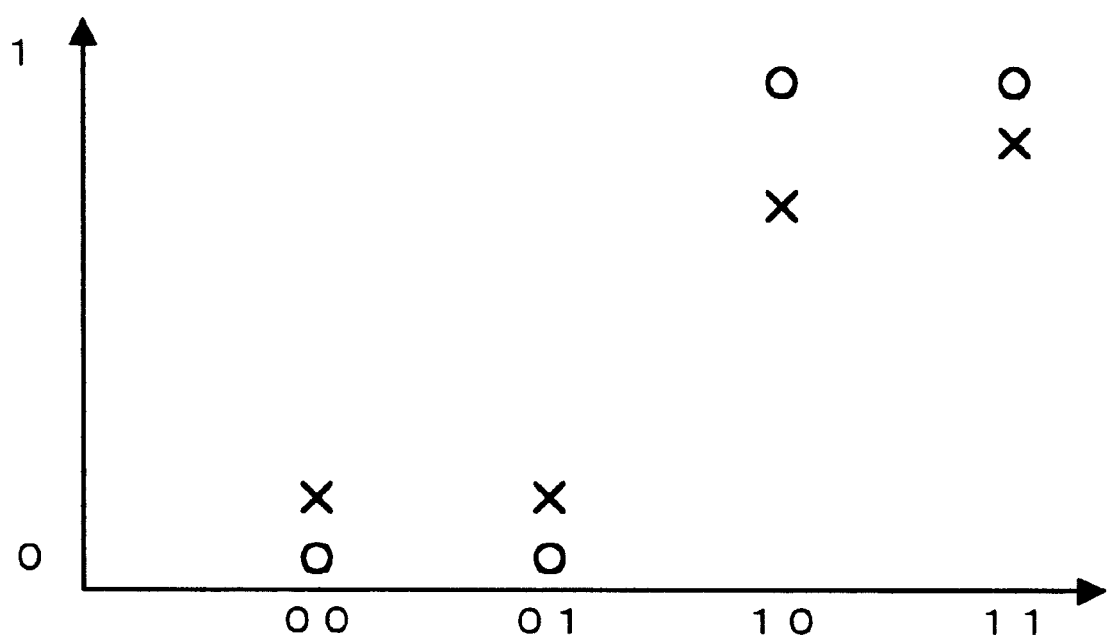
FIG. 10 is a graph which shows the neurovalues in the domains for each variable and the Boolean functions used for approximations thereof, this showing units that are different from those of FIG. 8.

As can be seen from FIG. 9, the existence of a term in a Boolean function after approximation means that the neural network value in the domain corresponding to the term is 0.5 or higher. For example, in FIG. 9 the term $$\bar{x} y$$

exists in the Boolean function after approximation, the neurovalue in the domain x=0, y=1 corresponding to that term being 0.5 or higher. For the existence of the term x, since $$x = x y \vee x \bar{y},$$

as shown in FIG. 10, it is necessary for the neurovalues to be 0.5 or higher for both the domain x=1, y=1 corresponding to x y, and the domain x=1, y=0 corresponding to the $$x\bar{y}.$$

(1-7) Exclusive OR Example

The exclusive OR is $$X \bar{Y} \vee \bar{X} Y.$$

The configuration of a neural network for learning the exclusive OR will first be described, followed by an analysis of the learning results.

(1-7-1) Neural Network Configuration

Figure 11:
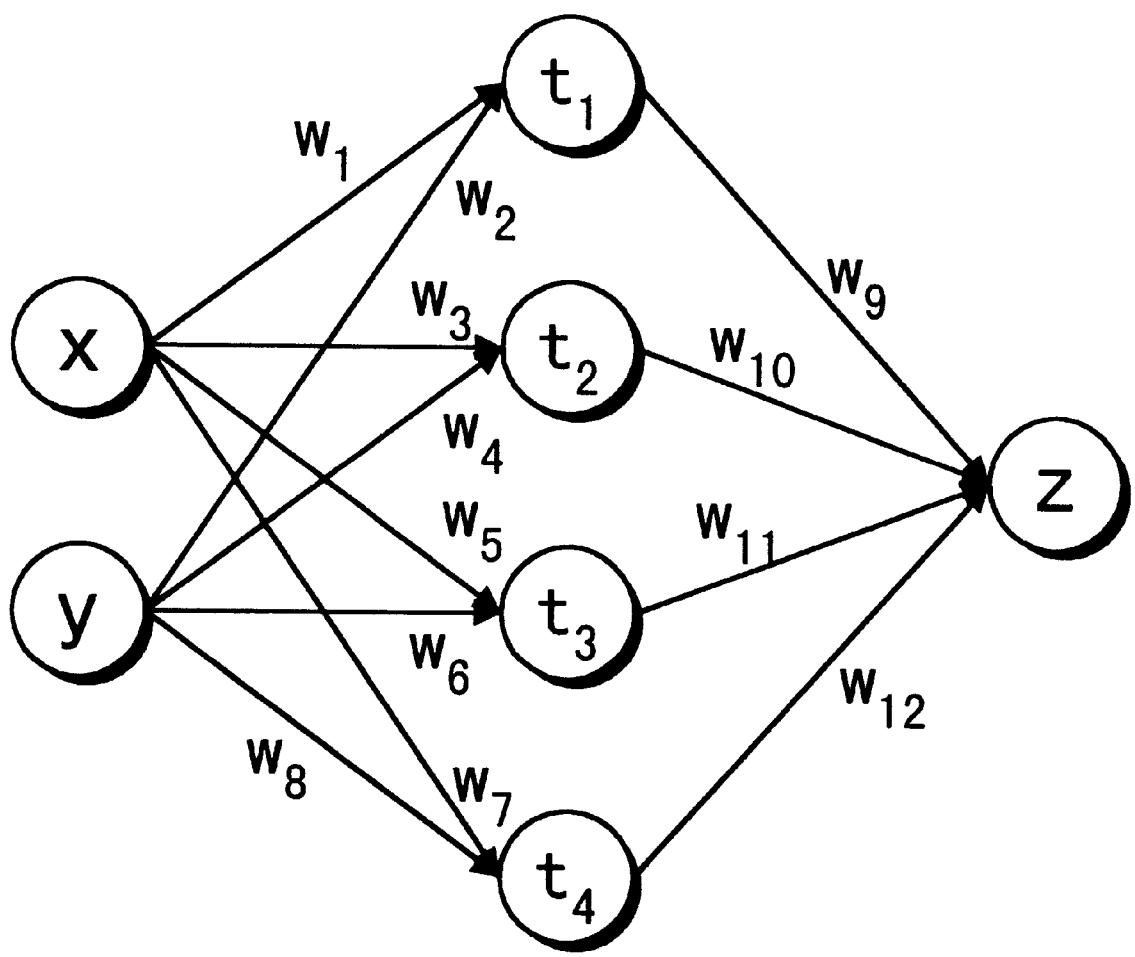
FIG. 11 is a schematic representation of an example of a neural network.

Consider a neural network such as shown in FIG. 11, in which x and y are inputs, z is an output, and $t_i$ units are intermediate (hidden) units. The $\omega_i$ values are the weighting coefficients. The intermediate outputs and outputs can be calculated as follows, using the sigmoid function $S(x)=1/(1+e^{-x})$, and bias values $h_i$.

$t_1 = S(\omega_1 x + \omega_2 y + h_1)$
$t_2 = S(\omega_3 x + \omega_4 y + h_2)$
$t_3 = S(\omega_5 x + \omega_6 Y + h_3)$
$t_4 = S(\omega_7 x + \omega_8 Y + h_4)$
$Z = S(\omega_9 t_1 + \omega_{10} t_2 + \omega_{11} t_3 + \omega_{12} t_4 + h_5)$ In the above, $S(\cdot)$ represents the sigmoid function $S(x)=1/(1+e^{-x})$.

(1-7-2) Analysis of Leaning Results

The results of learning an exclusive OR with the above-noted neural network are as follows.

$\omega_1=2.51, \omega_2=-4.80, \omega_3=-4.90,$
$\omega_4=2.83, \omega_5=-4.43, \omega_6=-4.32,$
$\omega_7=-0.70, \omega_8=-0.62, \omega_9=5.22,$
$\omega_{10}=5.24, \omega_{11}=-4.88, \omega_{13}=0.31,$
$h_1=-0.83, h_2=-1.12, h_3=-0.93,$
$h_4=-0.85, h_5=-2.19,$ For example, the value obtained for $t_1=S(2.51x-4.80y-0.83)$ are as follows.

$$t_1(1, 1) = S(2.51 \cdot 1 - 4.80 \cdot 1 - 0.83)$$
$$= S(-3.12)$$
$$t_1(1, 0) = S(2.51 \cdot 1 - 4.80 \cdot 0 - 0.83)$$
$$= S(1.68)$$
$$t_1(0, 1) = S(2.51 \cdot 0 - 4.80 \cdot 1 - 0.83)$$
$$= S(-5.63)$$
$$t_1(0, 0) = S(2.51 \cdot 0 - 4.80 \cdot 0 - 0.83)$$
$$= S(-0.83)$$

From the above, we have the following.

S (−3.12)≅0
S (1.68)≅1
S (−5.63)≅0
S (−0.83)≅0

Based on the above, we have $$t_1 \cong x \bar{y}.$$

In the same manner, the other units are approximated by the following Boolean functions.

$t_2 = \bar{x} y$
$t_3 = \bar{x} \bar{y}$
$t_4 = 0$

As a result, the results of learning z are as follows.

$$z = t_1 t_2 \vee \bar{t_1} \bar{t_2} t_3 \vee t_1 \bar{t_2} t_3$$

If $t_1 \cong x \bar{y}$
$t_2 = \bar{x} y$
$t_3 = \bar{x} \bar{y}$ are substituted into the above-noted representation of z, the result obtained is $$z = x \bar{y} \vee \bar{x} y.$$

The calculation using these substitutions is discussed in (1-7-3).

The proposition obtained in the above manner is the exclusive OR. Thus, by approximating a trained neural network that has learned the exclusive OR function, the original logical equation is derived. By examining the logical equations obtained from each unit, it is possible to verify the redundancy in the neural network. For example, if unit 1 ($t_1$) and unit 2 ($t_2$) are removed, the neural network shown in FIG. 11 does not function as an exclusive OR. The reason for this is that $t_1 = x\bar{y}$, $t_2 = \bar{x}y$.

However, even if unit 3 ($t_3$) and unit 4 ($t_4$) are removed, the neural network of FIG. 11 still operates as an exclusive OR function. The reason for this is that $t_3 = \bar{x}\bar{y}$, $t_4 = 0$.

Therefore, the neural network of FIG. 11 does not learn the redundancy of the four units contained therein. For example, if the Boolean function approximation of the learning results of unit 3 are $_3=x(1-y)$ and the Boolean function approximation of the learning results of unit 4 are $t_4=(1-x)y$, this would be learning that makes use of the redundancy of the four units.

(1-7-3) Substitution Calculation

Consider the process of making the following calculation.

$$z = t_1 t_2 \vee \overline{t_1 t_2 t_3} \vee \overline{t_2 t_3}$$
$$= x\bar{y} \vee \bar{x}y$$

First, from
$t_1 = x\bar{y}$
$t_2 = \bar{x}y$
$t_3 = \bar{x}\bar{y}$
we have $$t_1 t_2 = x\bar{y} \cdot \bar{x}y = 0$$

$$\overline{t_1 t_2 t_3} = (\overline{x\bar{y}}) \cdot \overline{x}y \cdot (\overline{\bar{x}\ \bar{y}})$$
$$= (\bar{x} \vee y) \cdot \bar{x}y \cdot (x \vee y)$$
$$= (\bar{x}y \vee \bar{x}y)(x \vee y)$$
$$= \bar{x}y(x \vee y)$$
$$= x\bar{x}y \vee \bar{x}yy$$
$$= \bar{x}y$$

$$t_1 \overline{t_2 t_3} = x\bar{y} \cdot (\overline{\bar{x}\ y}) \cdot (\overline{\bar{x}\ \bar{y}})$$
$$= x\bar{y}(x \vee \bar{y})(x \vee y)$$
$$= (x\bar{y} \vee x\bar{y})(x \vee y)$$
$$= x\bar{y}(x \vee y)$$
$$= xx\bar{y} \vee x\bar{y}y$$
$$= x\bar{y}$$

Therefore, we have $$z = 0 \vee \bar{x}y \vee x\bar{y}$$
$$= \bar{x}y \vee x\bar{y}$$

As described above, according to the present invention it is possible to perform a structural analysis of a neural network using approximations by Boolean functions, thereby enabling a human to understand the each unit and the overall structure of the neural network. This has the great advantage that it enables the knowledge thus gained to be used in correcting a trained neural network. For example, in the example presented above, it is possible to remove the hidden units 3 and 4. In this manner, if it is possible to analyze the learning results and remove redundant hidden units, it is possible to reduce the memory capacity and improve the execution speed when the trained neural network is implemented in hardware form. In a case in which it is possible to sufficiently approximate a proposition, it is also possible to replace the neural network with the proposition, in which case a great reduction in memory capacity and improvement in execution speed can be expected. Additionally, while neural networks generally require time to train, by approximating a neural network with a proposition as described above, it is possible to shorten the learning time.

(2) First Embodiment

The first embodiment will be now described. In this embodiment, which is implemented based on the above-noted basic concept, by making use of the fact that adopting a Euclidean distance in a prescribed domain means that the multilinear function space is a Euclidean space, in approximating the logical vector of a multilinear function with the logical vector of a Boolean function, the threshold value is established as 0.5.

(2-1) Configuration of the First Embodiment (2-1-1) Overall Configuration (FIG. 1)

FIG. 1 shows the overall configuration an analysis apparatus according to the first embodiment. This apparatus has a plurality of function-extracting apparatuses A1 through An and B, these corresponding to the hidden and output units of the neural network. The input sides of the function-extracting apparatuses A1 through An and B are connected to input means 1, which inputs the weighting coefficients and biases which establish the hidden units and output units of the trained neural network. This input means 1 can be an input device such as a keyboard, which performs successive input operations, and can also be an input means which automatically extracts the sigmoid functions of the units of the trained neural network and inputs these by using a variety of data transfer means.

A storage means 21 for storing weighting coefficients and biases is connected to the input means 1. This weighting coefficient and bias storage means 21 stores in it, for example, the input variable, weighting coefficient and bias for each unit in the form of the sigmoid function S ($p_1 x_1 + \ldots + p_n x_n + b$). A judgment condition storage section 22, into which are stored the threshold values used as conditions for generating each term, is connected to the input means 1.

The output sides of the function-extracting apparatuses A1 through An and B are connected to a Boolean function-synthesizing apparatus 6, which synthesizes Boolean function obtained from the units. This Boolean function-synthesizing apparatus 6 substitutes the hidden units that are represented by the input data variables into the Boolean functions of the output units that are represented by the hidden unit variables, thereby representing the output unit Boolean functions by input data variables.

An output means 8, which outputs the generated Boolean functions as logical propositions is connected to the apparatus 6. This output means 8 can be a display, a printer, or the like, and it is preferable that it be capable of presenting the generated logical propositions in an easy-to-grasp, visual manner. In this embodiment in particular, because one reason for treating the units of a neural network as logical propositions is to enable an understanding of redundancy in the neural network configuration, a redundant unit detection section 7, which detects a hidden unit having a duplicated proposition that is represented at the output side of the apparatus 6, is provided, and an output means 8 is used which enables a unique representation of a hidden unit that is detected by this redundant unit detection section 7.

(2-1-2) Configuration of the Function-Extracting Apparatuses

Figure 2:
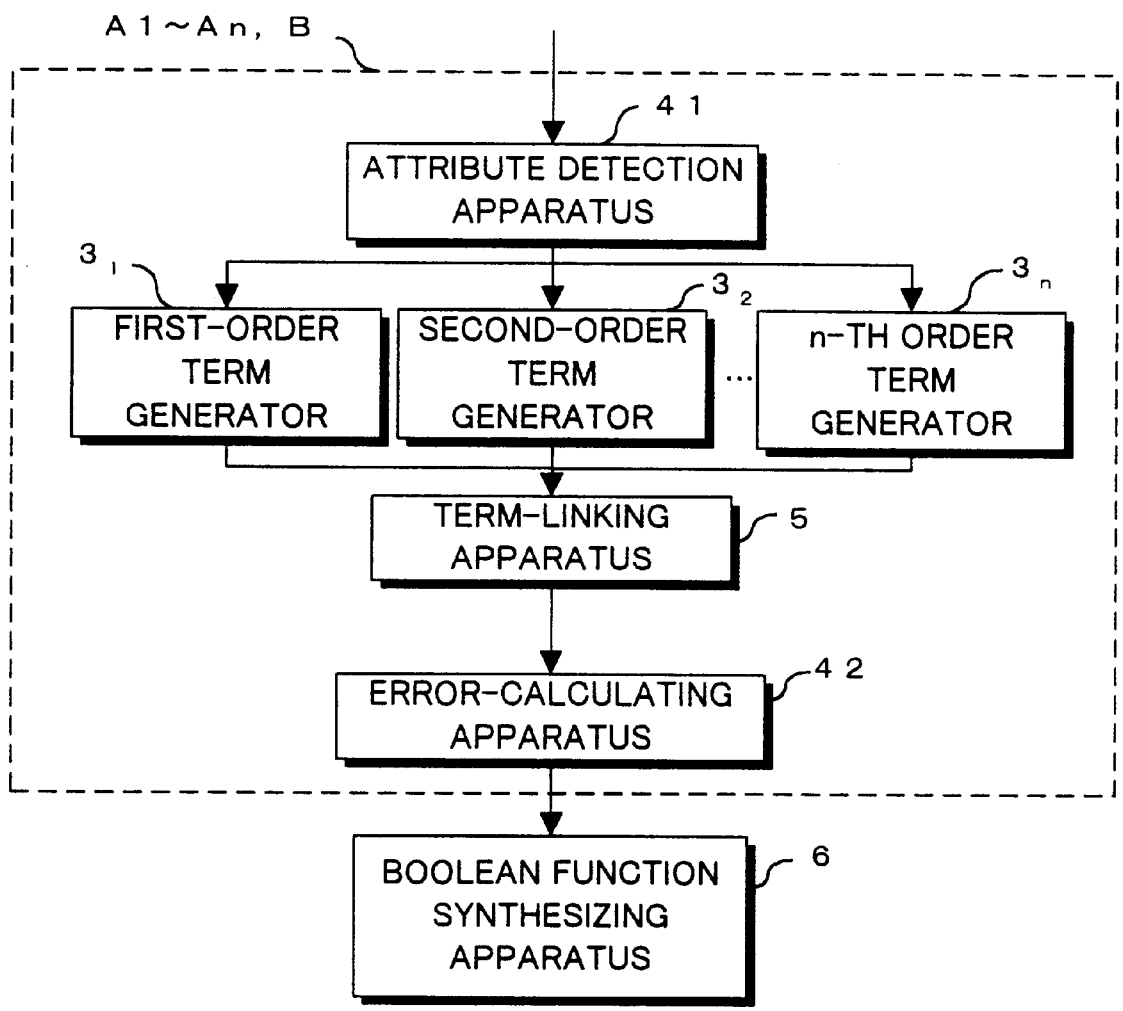
FIG. 2 is a block diagram which shows the configuration of a Boolean function extraction apparatus in the first embodiment of the present invention.

FIG. 2 shows the function-extracting apparatuses A1 through An and B for the hidden and output units in this embodiment.

Each of the function-extracting apparatuses is provided with an attribute detection apparatus 41, which detects the attributes of the learning data used in extracting each of the Boolean functions, the output side of this attribute detection apparatus 41 being connected to term generators ranging from a 1st-order term generator $3_1$ to an n-th order term generator $3_n$. The output sides of the 1st-order term generator $3_1$ to n-th order term generator $3_n$ are connected to a term-linking apparatus 5, which generates a DNF equation by taking the logical sum of the terms generated by each of the term generators. In addition, the output side of the term-linking apparatus 5 is provided with an error-calculating apparatus 42, which calculates the error between the Boolean function obtained by linking each of the terms and the output values of the units.

In the above-described embodiment, the attribute detection apparatus 41, the term generators $3_1$ through $3_n$, the judgment condition storage section 22, the term-linking apparatus 5, and the error-calculating apparatus 42 form a function-extracting means which approximates the output and hidden unit sigmoid functions with Boolean functions.

(2-1-3) Configuration of the Term Generators

Figure 3:
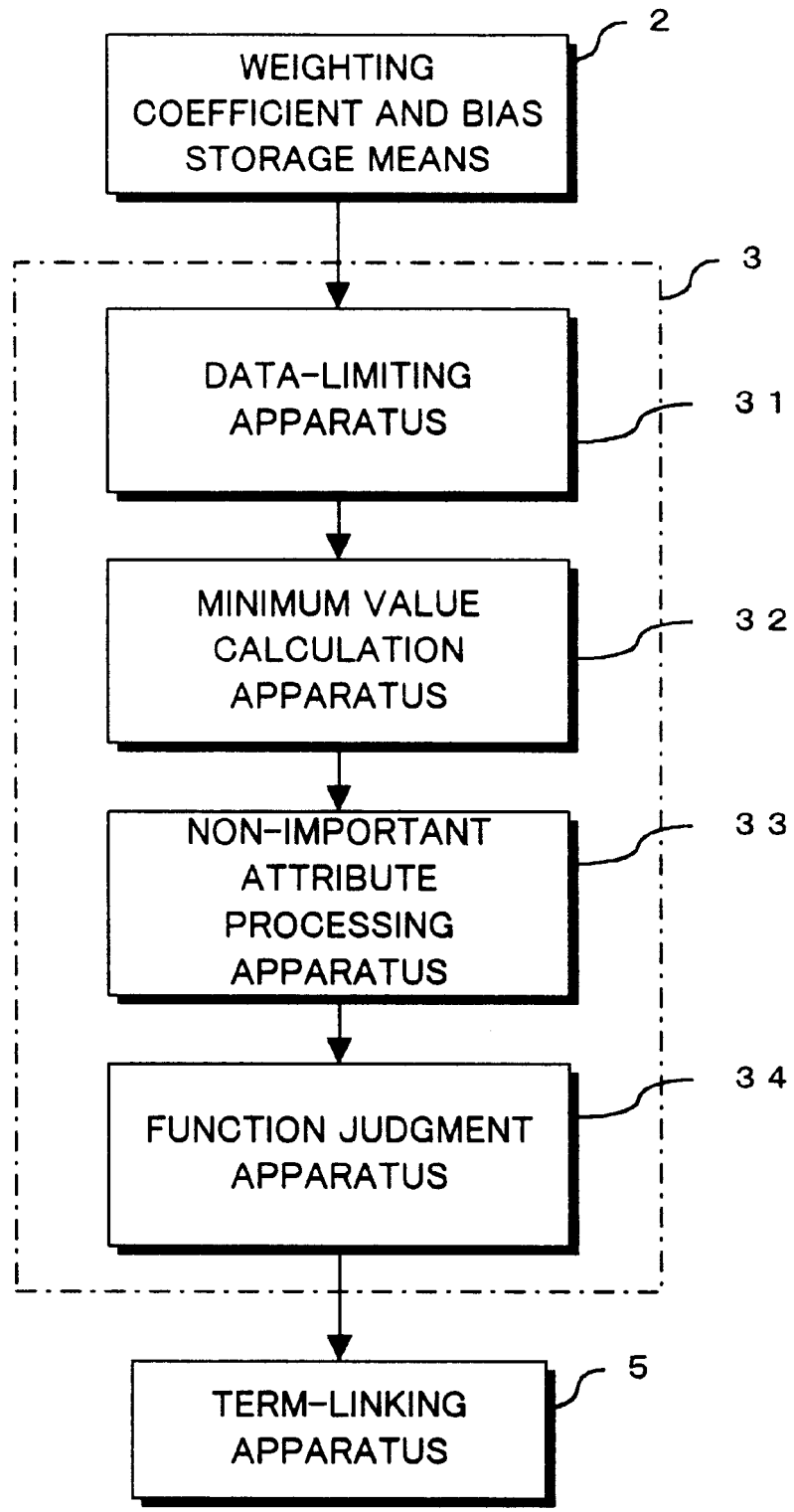
FIG. 3 is a block diagram which shows the configuration of a term generator in the first embodiment of the present invention.

FIG. 3 shows the configuration of each of the term generators 3 in each of the function-extracting apparatuses. The term generator 3 is formed by four sub-apparatuses, these being a data-limiting apparatus 31, a minimum value calculation apparatus 32, a non-important attribute processing apparatus 33, and a function judgment apparatus 34. The data-limiting apparatus 31 limits the learning data to a domain that corresponds to terms for which a judgment is made as to their existence in a Boolean function after approximation. By doing this, the range over which the minimum value is searched for is restricted. The minimum value calculation apparatus 32 calculates the minimum value for only important attributes among the limited data. The non-important attribute processing apparatus 33 takes the average with regard to non-important attributes. The function judgment apparatus 34 tests if the judgment value has exceeded a threshold value.

(2-2) Operation of the First Embodiment

Figure 4:
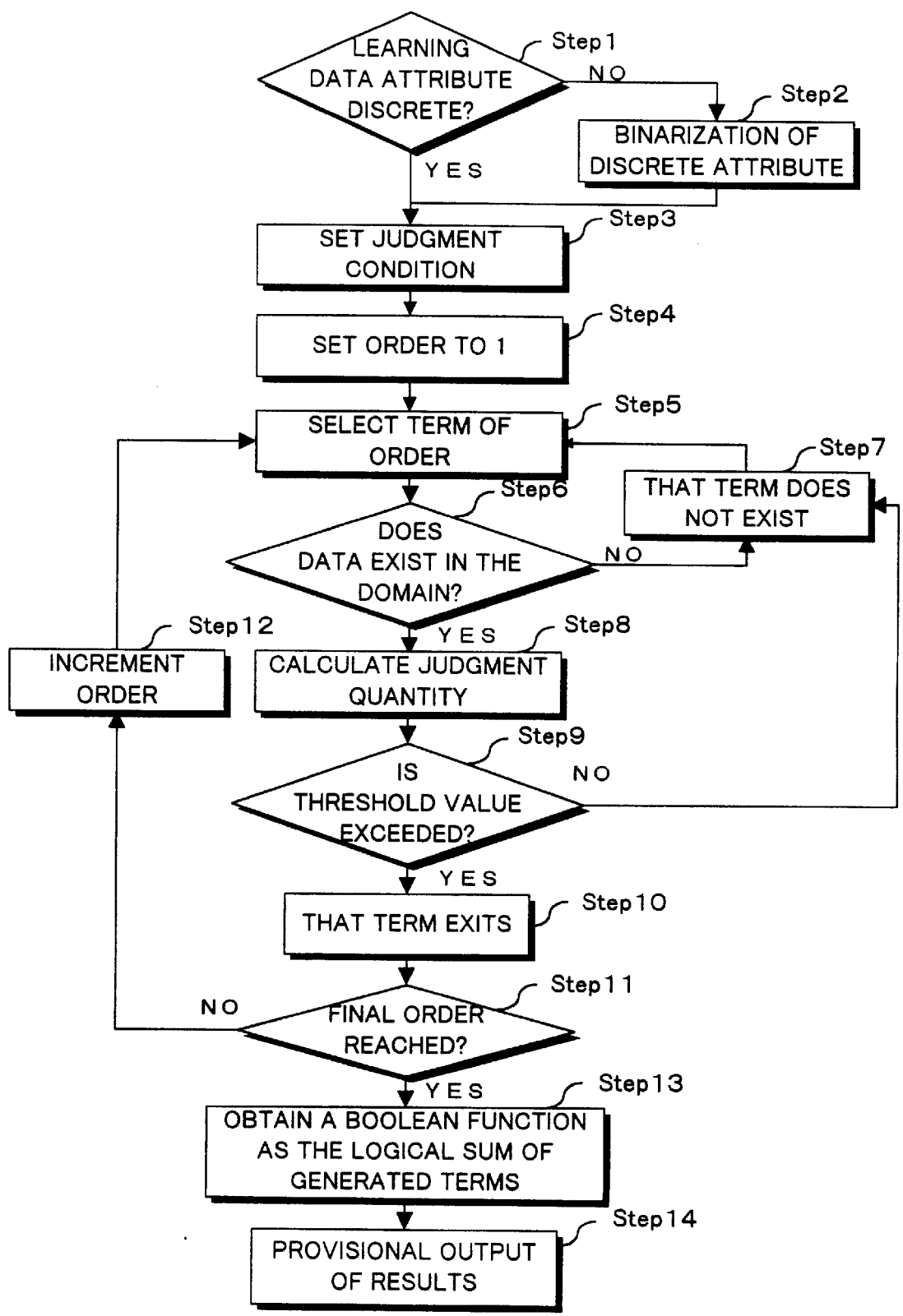
FIG. 4 is a flowchart which illustrates the steps in the first embodiment of the present invention.
Figure 5:
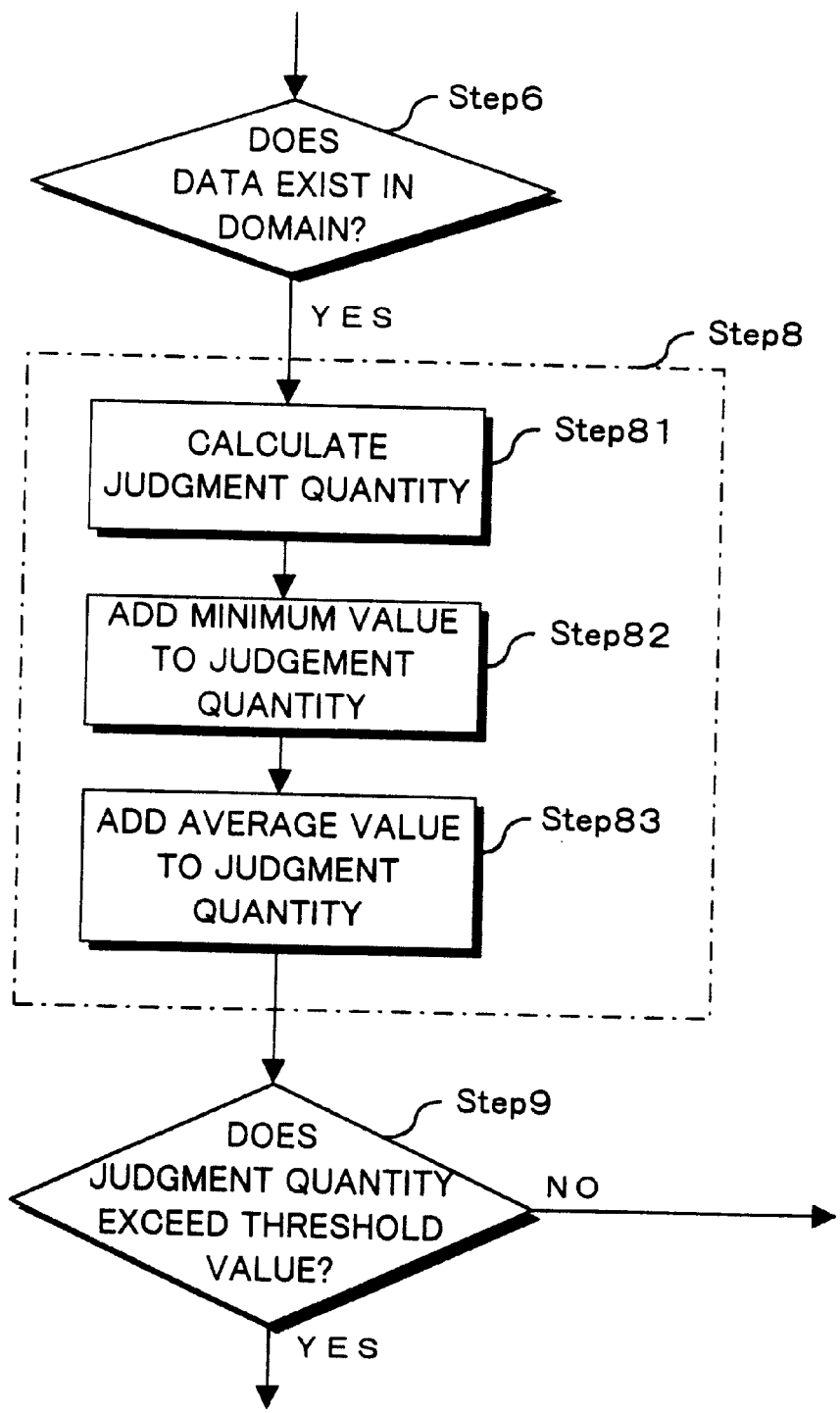
FIG. 5 is a flowchart which illustrates the calculation steps for discrimination values in the first embodiment of the present invention.
Figure 6:
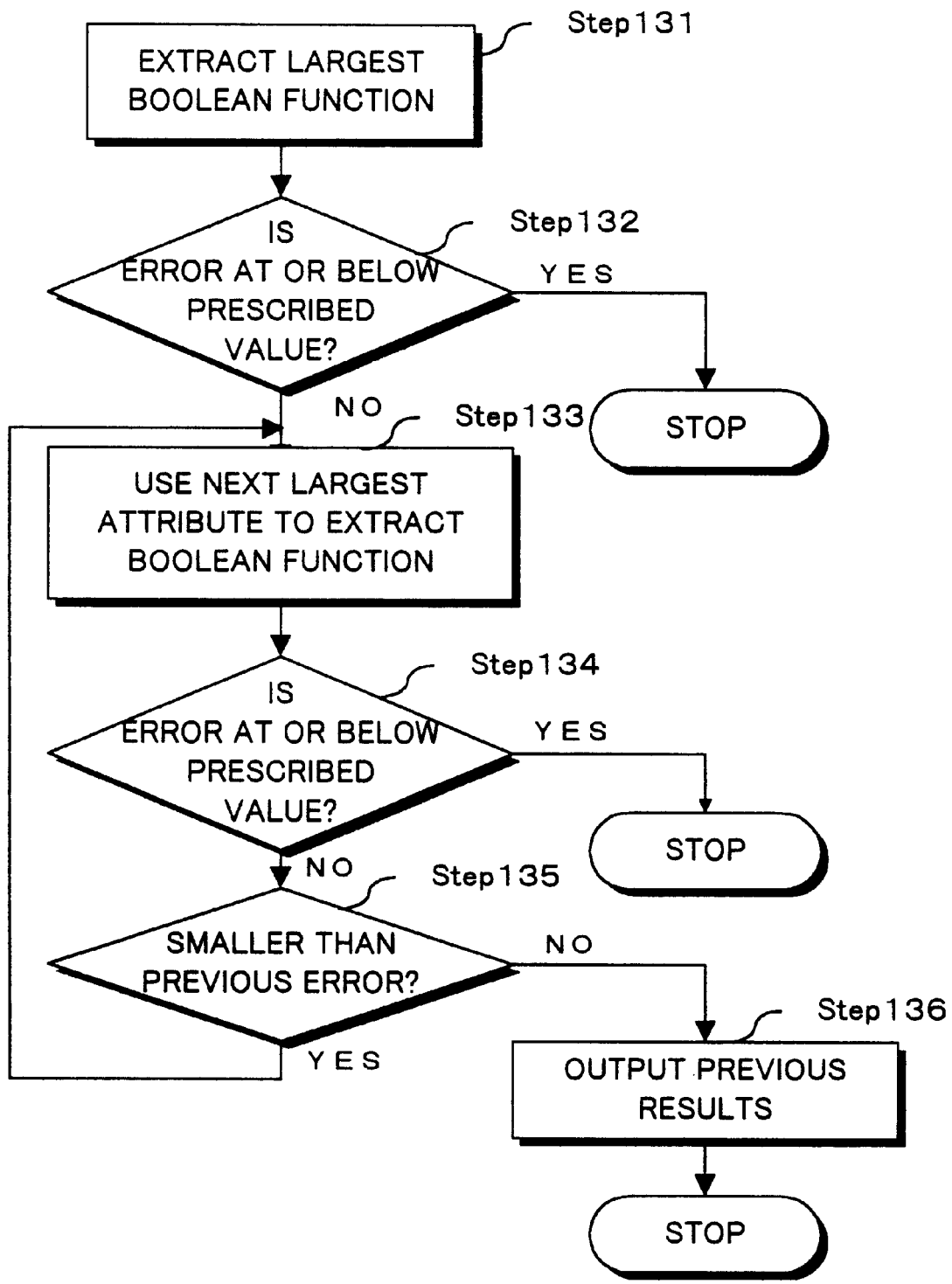
FIG. 6 is a flowchart which illustrates the steps in judging the error in the first embodiment of the present invention.

The operation of the first embodiment will be described with reference to FIG. 4 through FIG. 6. FIG. 4 is a flowchart which shows the basic operation of this embodiment, FIG. 5 is a flowchart which shows details of step 8 in FIG. 4, which calculates the judgment value, and FIG. 6 is a flowchart which shows details of step 13 of FIG. 4, which is provided to limit the error to below a certain value. The operation is described step-by-step below.

(2-2-1) Basic Operation (FIG. 4)

[Step 1] [Step 2] (Pre-processing of Learning Data)

In training a neural network, pre-processing of the learning data is done to judge whether or not the attributes of the learning data is discrete, and to represent discrete-value attributes by dummy binary variables. That is, because discrete attributes cannot be learned by the neural network as is, there is a need for a special measure. While several types can be envisioned, the above-noted binarization approach will be described. There is also a method of applying continuous value. Attributes which take on discrete values are represented as binary values in the domain $\{0, 1\}$, using dummy variables. The dummy variables establish the following values.

$x_{ij}=1$ when the attribute i has the value j $x_{ij}=0$ at other times

For example, when the values of the attribute A are $\{a_1, a_2, a_3\}$, the attribute value $a_2$ is represented as 0,1,0, in which case if the number of values of each attribute is $n_i$, the number of dummy variables is $$\Sigma n_i$$

If Table 1 is processed using dummy variables, the results shown in Table 2 are obtained.

TABLE 1

| Example | Example A, | B | Class |
|---|---|---|---|
| E1 | $a_1$ | ? | 1 |
| E2 | $a_1$ | $b_2$ | 2 |
| E3 | $a_2$ | $b_1$ | 1 |
| E4 | $a_1$ | $b_1$ | 1 |
| E5 | $a_3$ | $b_2$ | 2 |
| E6 | $a_2$ | $b_1$ | 2 |
| E7 | $a_3$ | $b_2$ | 1 |

Table 2: Example With Pre-Processing

TABLE 2-a

With Respect to Class 1

| Example | A | | | B | | Class 1 |
|---|---|---|---|---|---|---|
| | $a_1$ | $a_2$ | $a_3$ | $b_1$ | $b_2$ | |
| E1 | 1 | 0 | 0 | 1 | 0 | 1 |
| E2 | 1 | 0 | 0 | 0 | 1 | 0 |
| E3 | 0 | 1 | 0 | 1 | 0 | 1 |
| E4 | 1 | 0 | 0 | 1 | 1 | 1 |
| E5 | 0 | 0 | 1 | 0 | 0 | 0 |
| E6 | 0 | 1 | 0 | 1 | 0 | 0 |
| E7 | 0 | 0 | 1 | 0 | 1 | 1 |

TABLE 2-b

With Respect to Class 2

| Example | A | | | B | | Class 2 |
|---|---|---|---|---|---|---|
| | $a_1$ | $a_2$ | $a_3$ | $b_1$ | $b_2$ | |
| E1 | 1 | 0 | 0 | 1 | 0 | 0 |
| E2 | 1 | 0 | 0 | 0 | 1 | 1 |
| E3 | 0 | 1 | 0 | 1 | 0 | 0 |
| E4 | 1 | 0 | 0 | 1 | 1 | 0 |
| E5 | 0 | 0 | 1 | 0 | 0 | 1 |
| E6 | 0 | 1 | 0 | 1 | 0 | 1 |
| E7 | 0 | 0 | 1 | 0 | 1 | 0 |

[Step 3] (Setting of Judgment Condition)

At step 3, the above-noted judgment condition is set into the judgment condition storage section 22. This judgment condition setting can be done as a presetting into the hardware used to implement this embodiment of the present invention, and can also be done by input from the input means 1.

That is, under the condition that the term $$x_{i_f} \cdot x_{i_k} \overline{x_{i_{k+l}}} \cdot \overline{x_{i_l}}$$

exists in the Boolean function after approximation of the sigmoid function in step 1, within the learning data domain the setting is made of whether or not the minimum value of the neurovalues within the domain corresponding to that term exceeds a certain function. In this embodiment, 0.5 is set as the threshold value to judge whether or not that variable exists in the approximated Boolean function.

[Step 4] (Setting of the Order)

This is done to establish what term of the extracted Boolean function is to be calculated, and this is set at first to 1, so that the lowest order term is calculated first. The order is the number of variables in the logical product. For example, $x_i$ in the above-noted expression is of the first order, while $x_j x_k x_l$ is of the third order.

[Step 5] (Selection of the Term for Judgment)

The lowest order term (set to the first order in the above-noted step 4) of the approximated Boolean function is selected from the variables of the sigmoid functions that represent the hidden and output units stored in the weighting coefficient and bias storage means 2, and the processing is performed in accordance with the conditions set at the above-noted step 3. Thus, the data from the storage means 2 is sent to lowest-order term generator, this being the 1st-order term generator 31, the first order being generated in accordance with step 6 through step 11, which are described below.

[Step 6] [Step 7] (Limitation of Learning Data)

At the term generator 3, the data-limiting apparatus 31 limits the learning data to a domain that corresponds to terms for which a judgment is made as to their existence in the Boolean function after approximation. By doing this, the range over which the minimum value is searched for is restricted. The data-limiting apparatus 31 selects from the learning data the data in a domain corresponding to terms for which a judgment is made as to their existence in the approximated Boolean function. If no such data exists at this point, the judgment is made at step 7 that no term exists, and return is made to step 5 for selection of a new term.

[Step 8] (Calculation of a Judgment, Quantity)

If, however, such data does exist at step 7, calculation is made of the judgment quantity, in accordance with the associated attributes. At this point, the attributes are separated into important attributes (A attributes) and non-important attributes (B attributes) by the attribute detection apparatus 41, according to a method to be described later. While non-important attributes do not contribute to the determination of the minimum value, they can be processed in a variety of ways, the method being adopted here being that of taking their average value. Other methods are also possible. The details of this step will be described later, with reference being made to FIG. 5.

[Step 9] [Step 10] (Judgment Processing)

A judgment is made as to whether the calculated judgment quantity exceeds the threshold value that was set at step 3. If it is judged to exceed the threshold value, the judgment is made that this term exists.

[Step 11] [Step 12] (Stoppage of Term Generation)

After generating terms by the term generator 3 as described above, a judgment is made as to whether the term generation has reached a previously set order. If it has reached that order, the generation of terms is stopped. If it has not reached that order, the step is incremented by 1 at step 12 and return is made to step 5, calculation of the above-noted judgment quantity and comparison with the threshold value being repeated for the next higher order. In the example which is shown in FIG. 2, the term generators for orders 1 through n perform generation of each term of a Boolean function, the thus-obtained terms being output to the term-linking apparatus 5 which follows as the next stage.

With regard to a function for which existence was verified for the lowest-order term, there is no need to perform a verification of the existence of the terms from that order to higher orders. As a simple example, if the existence of x is known, since such terms as xy and xz exist $$x = x \lor xy \lor xz,$$

there is no need to verify the existence of xy and xz. Thus, this algorithm also provides simplification.

This can be described by means of the following example. Consider y=S (0.6$x_1$+0.2$x_2$+0.2$x_3$+0.2$x_3$+0.2$x_4$+0.05$x_5$−0.5)

as a unit of a neural network. First, with regard to $x_i$, since only S($p_1$+$p_6$) of $x_1$ is 0.5 or higher, $x_1$ exists. Next, with regard to $x_i x_j$, from which $x_l$ is removed, the fact that the sum of S($p_i$+$p_j$+$p_6$) also does not exceed 0.5 means that the term $x_i x_j$ does not exist. Then, with regard to $x_i x_j x_k$, from which $x_l$ is removed, because $p_2$+$p_3$+$p_4$+$P_6$ of $x_2 x_3 x_4$ is 0.5 or higher, $x_2 x_3 x_4$ exists. Removal of $x_1 x_2 x_3 x_4$ leaves $x_5$ and since this alone does not enable the generation of higher-order terms, the algorithm is ended at this point. Therefore, the terms that exist are $x_1$ and $x_2 x_3 x_4$.

Although the algorithm was ended in this embodiment at the third order, it is also possible to end it at the first order. When the order becomes large, the propositions that can be approximated by a Boolean function become complex and difficult to understand. For this reason, it is desirable that the order be set beforehand to an order that enables intuitive or relatively easy understanding by a human.

[Step 13] (Linking of Terms)

The term-linking apparatus 5 connects the terms that were generated at step 11 by the logical sum so as to generate a DNF equation, thereby resulting in a Boolean function that approximates the sigmoid functions of hidden and output units. That is, the terms generated by the 1st-order term generator $3_l$ through the n-th order term generator $3_n$ are connected by a logical sum at the term-linking apparatus 5, thereby determining the approximation Boolean function. In the above-noted example, the Boolean function thus established in the logical sum $$x_1 \lor x_2 x_3 x_4$$

of the terms $x_1$ and $x_2 x_3 x_4$.

[Step 14] (Output of Results)

The Boolean function obtained as described above is output, that function then being compared by the error calculation apparatus 42 with the output values of the various units so as to calculate the error. If the thus-calculated error is larger than a certain value, further selection is made of an important attribute, and the calculation of the judgment quantity is performed again. If, however, the error is at or below the certain value, the results are output. Because these results are obtained for each unit individually, Boolean functions which represent hidden units and Boolean-functions which represent output units are further synthesized by the Boolean-function synthesizing apparatus 6, the logical proposition of the output unit that was represented by the outputs of the hidden units being rewritten in terms of the input variables.

That is, of the Boolean functions generated in the above-noted manner, the Boolean function that represents the output unit represents the hidden units connected to the input side thereof as variables. For this reason, it is not possible to perform analysis of the output unit based on the contents of the input data. Because of this situation, in this step variables of the Boolean functions generated by the term-linking apparatus 5 of the hidden units are substituted into the variables of the Boolean function generated by the term-linking apparatus 5 of the output unit, this resulting in a representation of the Boolean function of the output unit by the input variables with respect to the neural network. This processing is performed by the Boolean function-synthesizing apparatus 6 shown in FIG. 1. The analysis results of each unit which are obtained by each term-linking apparatus 5 and Boolean function-synthesis apparatus 6 are output form the output means 8 as a Boolean function, that is, as a logical proposition that can be understood by a human. In this case, if there are units detected by the redundancy detection 7 are approximated by the same Boolean function, a unique output is made at the output means 8, enabling easy discrimination thereof by the analyzer. This type of output is effective in a case in which there is a large number of hidden units.

(2-2-2) Judgment Quantity Calculation Step

The judgment quantity calculation step 8 in the flowchart of the above-noted FIG. 4 uses the term generator apparatus shown in FIG. 3, and is made up of the following steps, such as shown in FIG. 5.

[Step 81]

In the above-noted step 6, learning data (D1) in a domain corresponding to terms for judgment of whether or not the term exists in the Boolean function after approximation is selected from the learning data (D0). At this point, if such data exists, the data-limiting apparatus 31 takes the sum of the sum of the weighting coefficients corresponding to the variables (affirmative variables) included in that term and the bias as the judgment quantity V. Essentially, the relationship is V=S((Sum of affirmative variable weighting coefficients)+bias)

[Step 82]

At the minimum value calculation apparatus 32 the minimum value of the neurovalue S ($p_i x_i$+ . . . +$p_n x_n$+b) with regard to the important attributes (A attributes) among the learning data D1 that was selected at step 6 is calculated. When this calculation is done, because the data has been limited the ones in the domain with regard to that term in the previous stage, the values of variables included in the term are fixed at either 1 or 0, so that when calculating the minimum value, only the variables included in the A attributes are involved. This minimum value is as follows.

V=S((Sum of weighting coefficients of affirmative variables)+bias+A attribute minimum value)

The establishment of the important attributes is performed by the attribute detection apparatus 41, using a method that will be described later, with reference to the flowchart of FIG. 6.

[Step 83]

With regard to non-important attributes, because these are not involved in determining the minimum value, while there are various methods that can be envisioned, the method adopted here is that of taking the average value thereof. Other methods are also possible. That is, if the non-importance processing apparatus 33 adds the B attribute average value to the above-noted judgment quantity V, we have the following.

V=S((Sum of weighting coefficient of affirmative variables)+bias+A attribute minimum value+B attribute average value)

In this manner, after the judgment quantity B is determined, a test is made, as shown in step 9, as to whether or not this judgment quantity exceeds the threshold value. In this case, the threshold value 0.5 that is stored into the above-described storage means 22 is used. That is, if the judgment quantity V exceeds 0.5 the term in question exists, but if it does not exceed the threshold value the term does not exist. The test with respect to the threshold value is, therefore, as follows.

V=S((Sum of weighting coefficient of affirmative variables) +bias+A attribute minimum value+B attribute average value)>0.5

(2-2-3) Judgment Quantity Calculation Example

Consider, for example, the data which is shown in Table 3, which shows the 3 binary attributes ($x_1$, $x_2$, and $x_3$).

TABLE 3

| data | Example | | | class |
|------|---------|----------|----------|-------|
|      | $x_1$   | $x_2$    | $x_3$    |       |
| 1    | 0       | 0        | 0        | 0     |
| 2    | 1       | 0        | 0        | 0     |
| 3    | 1       | 1        | 0        | 1     |

In the above-noted example, the learning data domain is (0,0,0), (1,0,0), and (1,1,0). Assume a neural network unit of S ($3x_1+4x_2+2x_3-1$), and further assume that $x_2$ belongs to the A attributes and that $x_3$ belongs to the B attributes. Let us make a judgment as to whether or not $x_1$ exists in the Boolean function after approximation. First, selection is made using the data-limiting apparatus 31, from the learning data (D0) of the data in the domain (D1) which corresponds to terms for which judgment is to be made as to existence thereof in the approximation Boolean function. As a result, in the example shown above, data 2 and data 3 are selected. The sum of the sum of weighting coefficients corresponding to the variables (affirmative) variables existing affirmatively in this term and the bias is taken as the judgment quantity V. In the above-noted example, V=S (3−1)=S (2).

Next, the minimum value calculation apparatus 32 calculates the minimum neurovalue with regard to the A attributes in the thus-selected learning data D1. When performing this calculation, because the data has been limited the ones in the domain with regard to that term in the previous stage, the values of the variables included in the term are fixed at either 1 or 0. In this example, the value is fixed as 1. When calculating the minimum value, only the variables included in the A attributes are involved. In this example, this is $x_2$, which is 1 for data 3 and 0 for data 2, so that the minimum value is when $x_2$ is 0. Therefore,

V=S (2+0)=S(2).

Additionally, by means of the non-importance processing apparatus 33, if the average value of the B attributes is added to the above-noted judgment quantity, since the variable the belongs to the B attributes is $x_3$, the average value of this is taken. There are a number of methods of taking the average that can be envisioned, and in this case the average of the limited learning data is taken. The limited learning data is data 2 and data 3, for either of which $x_3$=0, so that the average value is 0. Therefore,

V=S (2+0)=S (0).

In the threshold value judgment apparatus 34, a test is made as to whether or not the above-noted judgment quantity exceeds the threshold value. The threshold value is taken as 0.5 in this case.

Since V=S (2)>0.5, the term $x_1$ is taken as existing in the Boolean function after approximation.

(2-2-4) Establishing Important Attributes

Next, the method of detecting important attributes which are required in step 8 and in calculating the minimum value in each of the term generators will be described. That is, if all the weighting coefficients are used, not only are weighting coefficient with small absolute values not important, they are a harmful phenomenon of a level equivalent to that of noise, resulting in the problems of:

the generation of a complex proposition, and the generation of a proposition with poor accuracy.

Because of the above-noted problems, the attributes are divided into important attributes (A attributes) and non-important attributes (B attributes), by a method to be described later. It is possible to use only weighting coefficient with large absolute values as the important attributes. That is, the weighting coefficient of units of the neural network are arranged in the sequence of decreasing absolute value, as follows.

$$|p_1| \geq |p_2| \geq \ldots \geq |p_n|$$

Of the above, only those weighting coefficients having a large absolute value are used. In the case of a continuous domain, the above is appropriate. However, for a discrete domain, when binarization is done the value obtained by dividing the sum of the squares of the weighting coefficients belonging to a given attribute by the number of variables, this being $$\left[\sum_1^n p_i^2\right] / n (=p)$$

is used in place of the absolute value of the weighting coefficient. In the above, n is the number of attribute variables. Stated in other terms, this the number of attribute values.

$$p_1 \geq p_2 \geq \ldots \geq p_n$$

In this embodiment, the establishment of the number of important attributes, as shown in step 13, is made by means of the error between the neurovalue and the approximation Boolean function. That is, as shown in the flowchart of FIG. 6, a Boolean function is extracted by the term generator 3 (step 131) by only the attribute that has the largest absolute value, and the error between that Boolean function and the output value of the unit is calculated by the error calculation apparatus 42. If the that error is within a given value (step 132), the process is stopped at this point. If, however, the error is larger than the given value, the next largest weighting coefficient is used and the error is calculated again (step 133). Thereafter, a new Boolean function is extracted in the same manner and a test is made to see whether the error is at or below a given value (step 134). If the error is not larger than the previous error (step 135), the process is stopped at that point. If the error of newly extracted Boolean function is larger than that of the previous Boolean function, the results of the previous Boolean function extraction are output and the process is stopped (step 136).

The method of calculating the error is that of taking the sum of the squares of the difference between the neurovalue and the Boolean function in each domain. For the hidden unit 1 of FIG. 11, for example, this would be as follows.

$$t_1(1, 1) = S(2.51 \cdot 1 - 4.80 \cdot 1 - 0.83)$$
$$= S(-3.12),$$

$$t_1(1, 0) = S(2.51 \cdot 1 - 4.80 \cdot 0 - 0.83)$$
$$= S(1.68),$$

$$t_1(0, 1) = S(2.51 \cdot 0 - 4.80 \cdot 1 - 0.83)$$
$$= S(-5.63),$$

$$t_1(0, 0) = S(2.51 \cdot 0 - 4.80 \cdot 0 - 0.83)$$
$$= S(-0.83).$$

Thus, if the Boolean function is B(x, y), the error is as follows.

$$((t_1(1,1)-B(1,1)^2+(t_1(1,0)-B(1,0))^2+(t_1(0,1)-B(0.1))^2+(t_1(0,0)-B(0,0)^2)/4$$

(3) Second Embodiment

The second embodiment is for the case of a continuous attribute. In the above-noted embodiment, the neurovalue is approximated in a discrete domain by a Boolean function. To do this over a continuous domain, it is necessary to first consider the operations performed in a discrete domain. What has been done is that a neurovalue has been approximated by a Boolean function in a Euclidean space. Additionally, a neurovalue in a discrete domain is a multilinear function, the space of this multilinear function being a Euclidean space.

(3-1) Multilinear Functions

A multilinear n function is, in general expressible as follows.

$$\Sigma a_i x_1^{e_1} \ldots x_n^{e_n}$$

In the above, $a_i$ is a real number, $x_1$ is a variable, and $e_1$ is either 1 or 0. For example, in terms of a binary function, this could be, for example, axy+bx+cy+d. While this multilinear function is linear with regard to each of the variables, it is overall non-linear. It is also possible to say that a multilinear function is a function that does not include a term $$x_1^{k_1} x_2^{k_2} \ldots x_n^{k_n},$$

where $$k_i \geq 2$$

Strictly speaking ax+b is not linear, but rather affine. Therefore, it might be appropriate to refer to the above-noted function as a multi-affine function. Because ax+b is referred to as being linear in many fields, the above function will be referred to as a multilinear function.

A k-th order multilinear function is one in which the highest order term is of the order k. For example, because the highest order term in the function axyz+bxy+cy+d is axyz, which is of the third order, this is a third-order multilinear function.

As described in section (1-4), that "a function that can be learned with regard to a discrete domain by a neural network is a multilinear function" is a theorem. This can be proven for the case of a discrete domain by introducing dummy variables. Therefore, for an n variable order function, we have the following.

$$\{0,1\}^n \to R$$

Because the domain is {0, 1}, the following relationship obtains.

$$x^k = x (k \geq 2)$$

Therefore, the following function is a multilinear function.

$$\{0,1\}^n \to R$$

(3-2) The Case of a Continuous Domain

In the case of a continuous domain, normalization to [0.1] is possible by some method. For example, the normalization of the maximum and minimum values of data to [0, 1] is one such method. Therefore, the domain is made [1, 0]. The method of the discrete domain is extended to a continuous domain. For a discrete domain the neurovalues are approximated by Boolean functions. What, however, should be used to approximate neurovalues in the case of a continuous domain? A system of expression corresponding to Boolean functions must be determined for a continuous domain. That is, a qualitative system of expression corresponding to the Boolean function for the domain [0. 0] must be considered. The simplest qualitative expression over a continuous domain that is familiar to us would be proportionality and inverse proportionality. We will consider at this point the formulation of proportionality and inverse proportionality. FIG. 7 shows proportionality and inverse proportionality. While the proportionality shown is the normal direct proportionality, the inverse proportionality is a bit different that the normal inverse proportionality (y=−x), this rather being y=1−x. The reason for this is that y=1−x is a natural extension of the negation of a Boolean function. The proportionality is the natural extension of affirmation. In a Boolean function, in addition to affirmation and negation, there exist the logical product and the logical sum. Consider the operations which correspond to these over [0. 1], in addition to the above-noted proportionality and inverse proportionality, we would like to adopt these as a system of expression over [0, 1]. This can be seen as the simplest qualitative expression system over [0, 1]. The logical product and logical sum over [0, 1] are also obtained by natural extensions of the Boolean function logical product and logical sum. Because this qualitative expression system satisfies the axioms of Boolean functions, these will be referred to as continuous Boolean functions.

Because we need a quantitative expression, quantitative quantities must be ignored by some method. For example, consider the two functions A and B. The functions A and B in FIG. 7 are different functions, and are also different from the direct proportionality x. However, these two functions can be said to be proportional. That is, as the independent variable increases, the associated function value increases monotonically. If we observe only the qualitative characteristics of proportionality, we must treat these three functions A, B, and x as the same. That is, in the qualitative expression system that we seek, these three functions must be the same. In this qualitative system of expression, therefore, the following expression must be treated the same as x.

$$x_k (k \geq 2)$$

Mathematically, some form of norm must be introduced, with which the above-noted three functions has a distance of 0. Such a qualitative norm can be represented mathematically.

While the neurovalue is a multilinear function, for the domain [0.1], this is not necessarily so. However, if the above-described qualitative expression is used, the neurovalue becomes a multilinear function, the space of this multilinear function becoming a Euclidean space by means of the above-noted qualitative norm. Thus, the neurovalues are approximated by a continuous Boolean function, which is a qualitative expression system.

(3-3) The Case of a Discrete Domain

If the domain is {0. 1}, the multilinear function space is a Euclidean space if the inner product <f, g> is defined as follows.

$$<f,g> = 2^n \int_0^1 \tau(fg) dx$$

In the above, $$\tau(x_n) = x.$$

The qualitative form |f| is defined as follows.

$$|f| = <f,f>^{1/2}$$

The above-noted norm is the qualitative norm discussed above. The existence of the $$\tau$$

of the above-noted equation within the integrated expression makes the above-noted norm a qualitative norm, and $$\tau$$

enables $x_n$ and x to be treated as the same.

(3-4) Continuous Boolean functions

Next, consider the continuous Boolean function, which is a qualitative expression system, the form of which is the same as a Boolean function. The associated logical operations are as follows.

With respect to defined functions f and g, the logical product, logical sum, and negation are defined as follows. Note that the sum, difference and product noted below are the elementary algebraic operations.

(1) Logical product
$$\tau(fg)$$
(2) Logical sum
$$\tau(f+g-fg)$$
(3) Negation
$$\tau(1-f)$$

Because a function for which the Boolean function definition has been extended from {0, 1} to [0. 1] satisfies all the axioms of Boolean algebra using the above-defined logical operations, this will be called a continuous Boolean function. For example, the following are continuous Boolean functions.

$$x+y-xy (=x \vee y)$$

$$1-y (=\bar{y})$$

Note, however, that $$x,y \in [0, 1]$$

A calculation example follows.
The equation $$X \vee Y) \wedge (X \vee Y) = X \vee Y$$

is calculated as follows.

$$\tau((x+y-xy)(x+y-xy)) = \tau(x^2 + y^2 + x^2y^2 + 2xy - 2x^2y - 2xy^2)$$
$$= x + y + xy + 2xy - 2xy - 2xy$$
$$= (x + y - xy)$$

(3-5) Configuration of the Second Embodiment

As described above, even in the case of a continuous domain, that is, in the case of normalization to the domain [0, 1], since almost the same properties obtain as with a discrete domain, in a multilinear function space which is transformed to a Euclidean space by a qualitative norm, it is possible to approximate neurovalues by using continuous Boolean functions. Because approximation within the multilinear function space of the domain [0, 1] is exactly the same as approximation within the multilinear function space of the domain {0, 1}, it is possible to use the discrete domain algorithm as is. However, the domain for the calculation of the error is [0, 1] in the case of a continuous domain, making it necessary to approximate this to {0, 1}. For example, in the case of the two variables x and y, if the learning data domain for neurovalues is (0.7, 0.1), this is approximated by (1,0).

Figure 8:
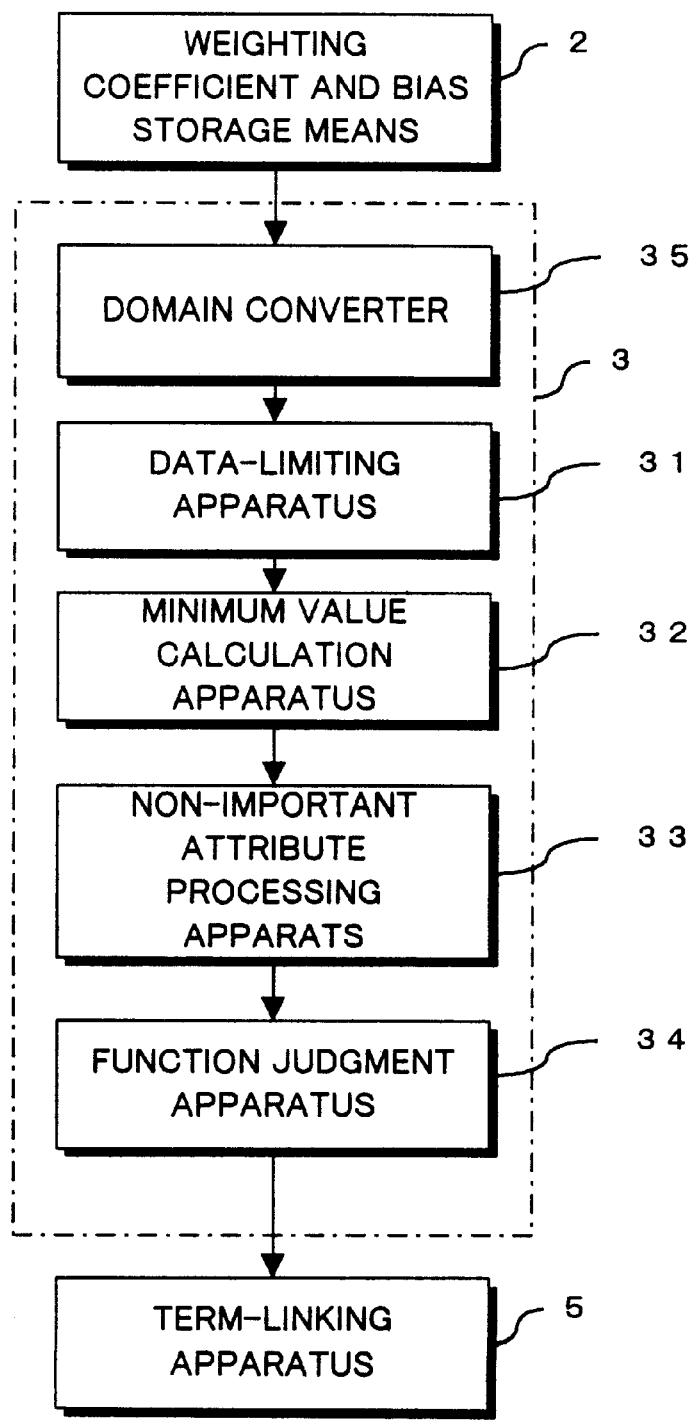
FIG. 8 is a block diagram which shows the configuration of a term generator in the second embodiment of the present invention.

In the second embodiment, as shown in FIG. 8, in the term generator 3, a domain converter 35 is provided before the data-limiting apparatus 31, so that even in the case of a continuous domain, it is possible to generate terms in the same manner as the case of a discrete domain, as illustrated in FIG. 3.

(4) Other Embodiments

In the present invention, the linear function S(·) is an output function that outputs the values of each of the units of the neural network, and this need not be a sigmoid function. The restriction on the output function is that it be monotonic in the broad sense. That is, it can be either monotonically increasing or monotonically decreasing, and can even have a point of discontinuity. It should be noted that a sigmoid function is monotonically increasing.

It is also possible to set the threshold value to a value other than 0.5, and one method that can be envisioned for establishing this is the maximum likelihood method. The threshold value of 0.5 was established as such because of the adoption of the Euclidean distance in the multilinear function. If the discrete probability distribution distance is adopted in the multilinear function space, as shown with regard to the second embodiment, the KL quantity of information becomes this distance, and one method is to minimize this KL quantity of information to determine the threshold value. The minimization of the KL quantity of information is the maximum likelihood method. The KL quantity of information (Kullback-Leibler quantity) is one known reference for measuring the distance between a model and a true distribution when predicting the true probability distribution from given data.

EXAMPLES

Using the apparatuses and methods having configurations as described above, examples which analyze a trained neural network will be described. In each of these embodiments, 0.5 will be taken as the threshold value used as a judgment condition when generating Boolean functions for approximation.

(1) First Example

The first example is with regard to election data. The name of the data is voting-records, and the data is taken from the US congress in 1984. The attributes to be input to the neural network are a number of policies, these being the 16 listed below. The attribute values for each attribute are the yes or no votes (y, n) of the congress members. The class is the political party to which a congress member belongs, the neural network outputting this as either Democratic or Republican.

1; handicapped-infants: y, n
2; water-project-cost-sharing: y, n
3; adoption-of-the-budget-resolution: y, n
4; physician-fee-freeze: y, n
5; ei-salvador-aid: y, n
6; religious-groups-in-schools: y, n
7; anti-satellite-test-ban: y,n
8; aid-to-nicaraguan-contras: y, n
9; mx-missile: y, n
10; immigration: y, n
11; synfuels-corporation-cutback: y, n
12; education-spending: y, n
13; superfund-right-to-sue: y, n
14; crime: y, n
15; duty-free-exports: y, n
16; export-administration-act-south-africa: y,n Consider the following example.

| 2 3 4 5 6 7 8 9 10 11 12 13 14 15 16 | Class | |
|---|---|---|
| y y y n y y y n y y y n y y y | n | Democratic Party |

The learning method is that of back-propagation, and repetition is stopped when the mean square error reaches 0.01. The learning is preformed with 232 examples which does not require processing of missing values, and prediction is done using the same data. The prediction accuracy of the trained neural network is 100%. While learning data and test data are normally separate, in the case of this experiment, since the goal is to test the accuracy of the proposition obtained from the neural network, it is thought to be desirable to make the correctness of the neural network that obtains the proposition itself be 100%. When performinig approximation of the units of the neural network by Boolean functions, the generation of terms starting at low order terms is stopped at the second order. The experiment was performed with 0, 3, and 4 hidden units, and with 3 initial values for weighting coefficients. The resulting proposition accuracies were as shown in Table 4.

TABLE 4

| Number of Hidden unit | Proposition Accuracy | | |
|---|---|---|---|
| | Initial value 1 | Initial value 2 | Initial value 3 |
| 0 | 0.974 | 0.974 | 0.974 |
| 3 | 0.983 | 0.987 | 0.974 |
| 4 | 0.974 | 0.974 | 0.974 |

With three hidden units, for the initial value 1, the following propositions were obtained.

Democratic party:
(physician-fee-freeze: n)∨(adoption-of-the-budget-resolution: y)
(anti-satellite-test-ban: n) (synfuels-corporation-cutback: y)
Republican party:
(physician-fee-freeze: y) ((adoption-of-the-budget-resolution: n)∨(anti-satellite-test-ban: y)∨(synfuels-corporation-cutback: n)
Similar propositions were obtained for the other cases.

(2) Second Example

The second example is for a neural network that processes mushroom data. The mushroom data has 22 discrete attributes and 2 classes (edible and poisonous), and 4062 data were used in the experiment. The conditions for this experiment were the same as for the election experiment. The resulting proposition accuracies were as shown in Table 5.

TABLE 5

Proposition Accuracies

| Number of Hidden unit | Initial value 1 | Initial value 2 | Initial value 3 |
| --- | --- | --- | --- |
| 0 | 0.985 | 0.985 | 0.985 |
| 3 | 0.985 | 0.985 | 0.985 |
| 4 | 0.985 | 0.970 | 0.974 |

With three hidden units, for the initial value 1, the following propositions were obtained.

Edible mushrooms:
(gill-size: broad) ((odor: almond)∨(odor: anise)∨(odor: none))
Poisonous mushrooms:
(gill-size: narrow)∨(odor: almond) $\overline{(odor: anise)}$ $\overline{(odor: none)}$
Similar propositions were obtained for the other cases.

(3) Third Example

The third example is for the analysis of each unit in a neural network trained to classify irises. The data name is iris. The iris data represented the four continuous examples of the sepal length (a), the sepal width (b), the petal length (c), and the petal width (d), and the classes were the three classes of setosa, vesicolour, and virginica. The continuous input was normalized to [1, 0]. The learning method was that of back-propagation, and repetition was stopped at the 20,000 time. For the proposition accuracy, the class for which the proposition (continuous Boolean function) value was the largest was calculated as the class for that data. The resulting proposition accuracies were as shown in Table 6.

TABLE 6

Proposition Accuracies

| Number of Hidden unit | Initial value 1 | Initial value 2 | Initial value 3 |
| --- | --- | --- | --- |
| 2 | 0.947 | 0.947 | 0.947 |
| 3 | 0.947 | 0.953 | 0.947 |

With three hidden units, for the initial value 1, the following propositions were obtained.

setosa: $\bar{c}\,\bar{d}$; petal both short and narrow
versicolour: c $\bar{d}$∨$\bar{c}$ d; (petal long and narrow) or (petal short and wide)
virginica: c d; petal ong and wide
It should be noted that the above-noted propositions are continuous Boolean functions.

For setosa,
$\bar{c}\,\bar{d}$
was obtained, which means (1−c)(1−d). Similar propositions were obtained for the other cases.

As described in detail above, according the present invention the units of a neural network are converted to Boolean functions, resulting in propositions that are easy for a human to understand, providing an understanding of which units learned which concepts. In particular, when it is desired to obtain a proposition of the learning of the overall neural network, it is possible to synthesize the propositions of each individual unit. In particular, when approximating each unit by a Boolean function using the present invention, the closest Boolean function in the given learning data domain is determined, enabling determination of a highly accuracy Boolean function. In extracting Boolean functions, because a judgment quantity is calculated based on important attributes, problems attributed to non-important attributes are eliminated, thereby not only achieving high accuracy in the extracted Boolean functions, but also ease of understanding of the proposition.

In the previous art, however, when performing approximation using Boolean functions, the amount of calculation is of an order that is exponentially related to the number of variables, so that an increase in the number of variables brings about the problem of a huge amount of required processing time.

Rather than applying learning data over the entire domain, a neural network is generally given learning data over only a very small part of the domain. For example, in the case of the election data to be described above, because there are 16 binary variables, there is a domain with a size of 216. However, only approximately 500 learning data are applied, so that learning data covering only less than 1 percent of the domain is applied. Therefore, the neural network values for 99 percent of the domain are predicted values. Because learning is done so that agreement is achieved with the learning data applied to the neural network, compared to neural network values within the learning data domain, the predicted values generally have a lower reliability. When approximating a neural network using Boolean functions, the use of these 99 percent of predicated values worsens the accuracy of the Boolean functions. That is, in the approximation of a neural network with Boolean functions, Boolean functions of higher accuracy are obtained by approximating over only the learning data domain, rather than by performing approximation over the entire domain.

What is claimed is:
1. A neural network analysis method comprising:
 inputting each intermediate and output element of a trained neural network to be analyzed as data represented by a multilinear function, the neural network having been trained by learning data in a given domain;
 approximating each intermediate and output element with a Boolean function approximation;
 synthesizing the Boolean function approximation of each intermediate and output element into a synthesized Boolean function; and
 outputting data, including the synthesized Boolean function, which is indicative of a predictive accuracy of the trained neural network, as an analysis result;
 wherein approximating each intermediate and output element with a Boolean function approximation further comprises,
  generating terms of a Boolean function for each intermediate and output element, and
  linking the terms using a logical sum to obtain a Boolean function approximation of each intermediate and output element, and
  said generating terms of a Boolean function for each intermediate and output element repeats a process comprising selecting a term that is made from a variable representing each intermediate and output element, limiting the learning data in the given domain to data within a limited subdomain corresponding to the term that is made from a variable, and making a judgment as to whether the term that is made from a variable exists in the Boolean function approximation based on data within the limited subdomain.

2. A neural network analysis method according to claim 1, wherein approximating each intermediate and output element with a Boolean function approximation and making a judgment comprises:

making a judgment as to whether a minimum value of each element, within the limited subdomain, exceeds a prescribed threshold value; and making a judgment that the term that is made from a variable exists in the Boolean function approximation when the minimum value exceeds the prescribed threshold value.

3. A neural network analysis method according to claim 2, wherein approximating each intermediate and output element with a Boolean function approximation comprises:

establishing a judgment quantity for judging a size of each attribute of the learning data; and approximating each element not using attributes for which the judgment quantity is at most a prescribed value and using only attributes for which the judgment quantity exceeds the prescribed value.

4. A neural network analysis method according to claim 3, wherein approximating each element with a Boolean function approximation comprises:

finding a minimum value of each element using an attribute for which the judgment quantity is largest;

extracting a Boolean function approximation based on the minimum;

calculating an error between the Boolean function approximation and the output value of each intermediate and output element and comparing the error with a given value;

when the error is above the given value, finding a minimum value of each intermediate and output element using another attribute for which the judgment quantity is a next largest attribute; and repeating the steps of finding a minimum value of each element using another attribute, extracting a Boolean function approximation, and calculating and comparing an error with the given value, until the error becomes at least one of larger than the previous error and below the given value, so as to reduce the error between the Boolean function approximation and a value of each intermediate and output element.

5. A neural network analysis method according to claim 2, wherein approximating each element with a Boolean function comprises:

finding a minimum value of each element with regard to an attribute for which the judgment quantity exceeds the prescribed value; and taking an average value of each element with regard to another attribute for which the judgment quantity does not exceed the prescribed value.

6. A neural network analysis method according to claim 1, wherein the approximating each element with a Boolean function approximation comprises:

approximating each element with a continuous Boolean function approximation that is a qualitative representation when the domain of the learning data is continuous.

7. A neural network analysis system comprising:

an input section for inputting each intermediate and output element of a neural network to be analyzed as data represented by a multilinear function, the neural network having been trained by learning data in a given domain;

a function-extracting section for approximating each input intermediate element and output element with a Boolean function approximation;

a function-synthesizing section for synthesizing the Boolean function approximation of each intermediate and output element obtained by each function-extracting section into a synthesized Boolean function; and an output section for outputting, data including the synthesized Boolean function which is indicative of a predictive accuracy of the trained neural network as an analysis result;

wherein the function-extracting section comprises, a term-generating section for generating each term of the Boolean function for each intermediate and output element, and a term-linking section for linking terms generated by the term-generating section using a logical sum to obtain Boolean function approximating, and the term-generating section has a data-limiting section for limiting the learning data in the given domain to data within a limited subdomain corresponding to a term to be generated, and a judgment section for making a judgment as to whether the term exists in the Boolean function approximation based on data within the subdomain limited by the data-limiting section.

8. A neural network analysis system according to claim 7, wherein the judgment section of the term-generating section is configured to make a judgment as to whether a minimum value of each intermediate and output element, within the limited subdomain, exceeds a prescribed threshold value, and make a judgment that the term exists in the Boolean function approximation when the minimum value exceeds the prescribed threshold value.

9. A neural network analysis system according to claim 8, wherein the function-extracting section is configured to establish a judgment quantity for judging size of each attribute of the learning data, and approximate each intermediate and output element not using attributes for which the judgment quantity is at most a prescribed value and using only attributes for which the judgment quantity exceeds the prescribed value.

10. A neural network analysis system according to claim 9, wherein the function-extracting section comprises an error-calculating section for calculating an error between a Boolean function approximation and the output value of each element obtained by the term-generating section and the term-linking section; and the function-extracting section is configured to repeat the extraction of a Boolean function approximation by the term-generating section and the term-linking section and the calculation of an error by the error-calculating section, using attributes in decreasing order of the size of the judgment quantity, until the error calculated by the error-calculating section becomes at least one of larger than the previous error and below the given value, so as to reduce the error between the Boolean function approximation each of the intermediate and output and a value of the element.

11. A neural network analysis system according to claim 8, wherein the function-extracting section is configured to find a minimum value of each element with regard to an attribute for which the judgment quantity exceeds the prescribed value, and take an average value of each element with regard to another attribute for which the judgment quantity does not exceed the prescribed value.

12. A neural network analysis method according to claim 7, wherein the function-extracting section is configured to approximate each intermediate and output element with a continuous Boolean function approximation that is a qualitative representation when the domain of the learning data is continuous.

13. A storage medium onto which is stored a computer program, wherein the program comprises:

a means for causing a computer to input each intermediate and output element of a neural network to be analyzed as data represented by a multilinear function, the neural network having been trained by learning data in a given domain;

a means for causing a computer to generate each term of a Boolean function by repeating a process comprising selecting a term that is made from a variable representing each intermediate element and output element, limiting the learning data in the given domain to data within a subdomain corresponding to the term, making a judgment as to whether the term that is made from a variable exists in Boolean function approximation based on data within the limited subdomain;

a means for causing a computer to approximate each intermediate and output element with a Boolean function approximation by linking generated terms using a logical sum to obtain the Boolean function approximation;

a means for causing a computer to synthesize the Boolean function approximation of each intermediate and output element into a synthesized Boolean function; and a means for causing a computer to output data, including the synthesized Boolean function, which is indicative of a predictive accuracy of the trained neural network as an analysis result.

* * * * *

UNITED STATES PATENT AND TRADEMARK OFFICE
CERTIFICATE OF CORRECTION

PATENT NO. : 6,353,816 B1
DATED : March 5, 2002
INVENTOR(S) : Tsukimoto

It is certified that error appears in the above-identified patent and that said Letters Patent is hereby corrected as shown below:

<u>Title page,</u>
Item [*], the Notice information should read:

-- [*]  Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days. --

Signed and Sealed this

Seventeenth Day of September, 2002

Attest:

JAMES E. ROGAN
*Attesting Officer*  *Director of the United States Patent and Trademark Office*